US006400359B1

(12) United States Patent
Katabami (10) Patent No.: US 6,400,359 B1
(45) Date of Patent: Jun. 4, 2002

(54) APPARATUS FOR DETECTING AN APPROACHING CONDUCTOR, OR AN APPROACH POINT OF A CONDUCTOR AND AN ELECTROSTATIC CAPACITY TYPE TOUCH PANEL APPARATUS

(75) Inventor: Koichiro Katabami, Ibaraki (JP)

(73) Assignee: Pentel Kabushiki Kaisha (JP)

( * ) Notice: Subject to any disclaimer, the term of this patent is extended or adjusted under 35 U.S.C. 154(b) by 0 days.

(21) Appl. No.: 09/383,653

(22) Filed: Aug. 26, 1999

(30) Foreign Application Priority Data

Aug. 27, 1998 (JP) .......................... 10-257610

(51) Int. Cl.[7] ............................... G09G 5/00
(52) U.S. Cl. .................. 345/173; 345/174; 345/179; 175/18.01; 175/18.03; 175/18.05; 175/20.1; 175/20.3
(58) Field of Search ................. 345/173, 174; 178/18.01, 18.03, 18.05, 18.08, 19.01, 20.01, 20.03

(56) References Cited

U.S. PATENT DOCUMENTS

| 4,071,691 | A | * | 1/1978 | Pepper, Jr. ............... 178/18.05 |
| 4,371,746 | A | * | 2/1983 | Pepper, Jr. ............... 178/18.05 |
| 4,698,460 | A | * | 10/1987 | Krein et al. .................. 345/173 |
| 4,853,498 | A | * | 8/1989 | Meadows et al. ............ 345/174 |
| 4,922,061 | A | * | 5/1990 | Meadows et al. ............ 345/173 |
| 5,053,757 | A | * | 10/1991 | Meadows ..................... 341/22 |
| 6,239,788 | B1 | * | 5/2001 | Nohno et al. ............ 178/18.03 |

FOREIGN PATENT DOCUMENTS

| JP | 61501953 | 9/1986 |
| JP | 1-19176 | 4/1989 |
| JP | 1231119 | 9/1989 |
| JP | 4-48244 | 8/1992 |
| JP | 6-1429 | 2/1994 |
| JP | 7-27434 | 3/1995 |
| JP | 7-69767 | 7/1995 |
| JP | 7-69769 | 7/1995 |
| JP | 7219709 | 8/1995 |
| JP | 8-77894 | 3/1996 |
| JP | 11304942 | 11/1999 |

* cited by examiner

Primary Examiner—Bipin Shalwala
Assistant Examiner—Jimmy H Nguyen
(74) Attorney, Agent, or Firm—Adams & Wilks (57) ABSTRACT

There are provided an apparatus for detecting an approaching conductor and an approach point or position of a conductor, in which a signal processing is simply performed and an improvement in the noise resistance is performed without the influence of a floating capacity. The apparatus has a voltage-oscillating system for equivalently receiving electric oscillation (AC signal) from a detected conductor so that the received electric oscillation is processed as a signal to ground and the processed signal is send to a non-oscillating system through an isolator, the system including a sensor panel or a sensor conductive array, a shield plate, a signal processing circuit, a ground, and power source. In addition, in order to clearly and securably identify a cause of the false earth effect of a detected conductor such as a human body, over 200 kHz oscillation frequency is provided. There is also provided an electrostatic capacity coupling type touch panel apparatus, in which an AC signal is applied into a finger, AC signal being 200 or more kHz frequency.

5 Claims, 9 Drawing Sheets

FIG. 12 ies were 200 kHz or less because of# APPARATUS FOR DETECTING AN APPROACHING CONDUCTOR, OR AN APPROACH POINT OF A CONDUCTOR AND AN ELECTROSTATIC CAPACITY TYPE TOUCH PANEL APPARATUS

FIELD OF THE INVENTION

The present invention relates to an apparatus for detecting an approaching conductor, an apparatus for detecting a an approach point of a conductor, and an electrostatic capacity type touch panel apparatus, and more specifically, to an apparatuses for detecting an approaching conductor and an approach point of a conductor, in which a position of a detected conductor is detected in accordance with an electrostatic coupling capacity generated between the detected conductor and a resistive membrane, and an electrostatic capacity type touch panel apparatus in which a state of a touching finger on a panel is detected by use of an electrostatic capacity between the finger and the panel.

BACKGROUND OF THE INVENTION

A conventional apparatus for detecting a position of a conductor is disclosed in Japanese Patent No. 1,536,723, for example, in which four corners of a resistive panel is voltage-driven by an operational amplifier, while a drive current is detected by a differential amplifier. Further, Japanese Patent Nos. 1,754,522 and 2,037,747 disclose an example in which detects a change in capacitance of a lattice-like conductor of a panel including a coupling capacity with a finger. Further, Japanese Patent No. 2,603,986 discloses an example which detects an impedance of a resistive panel including a coupling capacity with a finger. As another example, there is a finger-position detecting apparatus disclosed in Japanese Patent No. 1,881,208 in which four points of a touch panel is AC voltage-driven by a transformer, while a drive current component is applied to a differential amplifier.

The above-mentioned prior arts were based on an idea in which an electric signal is applied from a sensor panel into a detected conductor such as the human body. As a result, since a construction of their circuit was designed by use of complicated means, signals were not suitably processed. Furthermore, there was uncertainty (obscurity) why a false earth was caused by a detected conductor. Therefore, there was potential state which bring about an unstable detection.

Additionally, for electrostatic capacity type touch panel apparatuses in which AC signal is applied into a finger for detection of the approaching finger, in which an approaching finger is detected, which designates one section on the panel by means of a finger, and which indicates one point on the panel by means of a finger for inputting coordinates, the used signal frequencies were 200 kHz or less because of easy production of the apparatus.

However, also in the instance, there was a potential problem which bring about an uncertain detection, since the reason why a human body is grounded, was unstable (obscure) state.

SUMMARY OF THE INVENTION

Considering problems described-above, the present invention is to provide an apparatus for detecting an approaching conductor, an apparatus for detecting an approach point of a conductor, and the apparatus has a voltage-oscillating system which includes a sensor panel or a sensor conductor array, a shield panel, a signal processing circuit, a ground circuit and a power circuit such that a conductor such as a human body undergoes an electrostatic coupling, and thereby equivalently receives an electric oscillation (AC signal) so as to be processed as a signal to ground, and resultant processing output is then transmitted to a non-oscillating system through an isolator, the conductor belonging to the non-oscillating system (including resistors which enables an adequate flow of a stable oscillation).

Furthermore, oscillation frequency is set to over 200 kHz so that signals are unconditionally detected in a stable state. According to the present application, a term "a position of an approaching conductor" means a position where is about 1 m to 2 cm from the apparatus, and a term "approach point of a conductor" means a point where is in about 5 cm to 0 cm (contacting) from apparatus.

From the viewpoint, observation, or measurement of the voltage-oscillating system, it seems that voltage oscillation generated from the detected conductor belonging to the non-vibrating system is measured. In the present apparatus, the measurement of an electric oscillation (AC signal) is made, when AC signal is equivalently received by the sensor panel or sensor through an electrostatic coupling between a detected conductor and resistant membrane. In other words, it can be said to be the electric system which corresponds to the Ptolemaic system. This differs from the conventional processing of signals in which signals are applied into a finger of a human body as a conductor. According to the present invention, the received signals to ground can be processed by the voltage-oscillating system, and various designs of the circuit are then allowed. An input of low impedance effects easily considerable elimination of a bed influence of a floating capacity.

Furthermore, when a voltage oscillation is generated from the conductor such as a human body, lower electromagnetic wave is radiated due to the antenna effect of the human body. Generally, the radiant impedance of the antenna would be reduced, if higher oscillation frequency had been set. The conductor such as a human body undergoes a load of the radiant impedance. Therefore, even though the human body or operator is sitting on a chair or standing on a stand, the voltage oscillation is effectively suppressed in response to the oscillation frequency of over 200 kHz.

The present invention is concerned with neither of the apparatuses in which a measurement of impedance is made and in which a measurement of capacitance is made, but is directed to an apparatus for detecting an approaching conductor and/or an approach point of a conductor. The apparatus detects an approaching conductor and/or an approach point of a conductor in response to a level of a AC input signal of a voltage-oscillating system from the conductor such as a human body belonging to a non-oscillating system. In the apparatus, the false ground of the conductor is detected by use of the capacity to round, while the voltage oscillation undergoes suppression caused by a load due to the radiant impedance of the antenna. Therefore, even though the conductor having same size as a human body is at a distant position or point from the apparatus, the conductor can be detected in stable state.

The present invention is also directed to an electrostatic capacity type touch panel apparatus. In the apparatus, the false ground effect of the human body is not only performed by use of the capacity to ground, but also is performed by use of the voltage oscillation suppression effect caused by a load of the radiant impedance of the antenna. Therefore, even though a finger of the human body electrically floats on the apparatus, the finger is detected in stable state so that an AC signal can be applied into the finger.

DETAILED DESCRIPTION OF THE INVENTION

Figure 2:
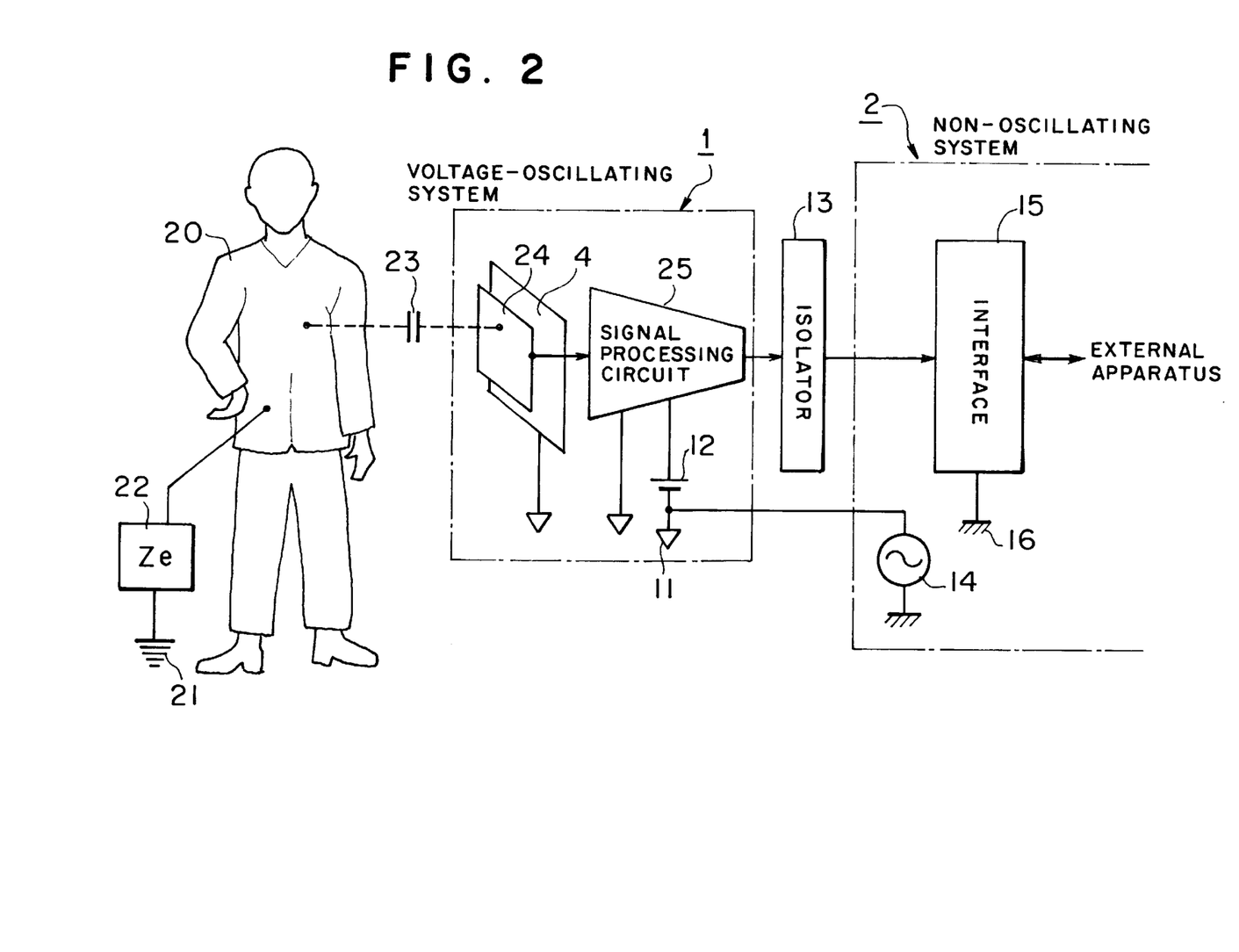
FIG. 2 is a schematic view of an apparatus for detecting an approaching conductor.

Description will be made in detail of the present invention hereinafter with reference to the accompanying drawings. Firstly, the description of an apparatus for detecting an approaching conductor is given, as shown in FIG. 2. The conductor for example is a human body 20. When the human body 20 approaches to a sensor conductive plate 24, the apparatus detects the approaching human body 20. The conductive plate 24 may be made of a resistive membrane.

In this embodiment, non-oscillating system 2 has an oscillatory voltage generator 14 for generating sine wave of 460 kHz for example. The oscillatory voltage generator 14 has an output connected with a ground circuit 11 or a power source 12 having a power circuit and provided in a voltage-oscillating system 1. Therefore, the voltage-oscillating system 1 as a whole generates a voltage oscillation in phase and amplitude of 460 kHz frequency.

The sensor conductive plate 24 is connected to an input circuit of a signal processing circuit 25. The input circuit has a low input impedance (details of which will be described later) and thus the sensor conductive plate 24 also generates voltage oscillation, as being generated by the ground circuit 11 in the voltage oscillation system. The sensor conductive plate 24 may comprise an electric resistant membrane, which is formed over glass, a glass epoxy substrate or the like by a coating or a vapor-depositing process. A shield plate 4 may not be necessarily provided.

Thus, the voltage oscillating system 1 as whole generates voltage oscillation in phase and amplitude, but no electric oscillation is generated between any mutual points provided in the voltage oscillation system. Therefore, only from the viewpoint of the outside of the voltage oscillating system 1, it is apparent that the voltage oscillating system as whole generates oscillation.

When the human body 20 as a conductor stands nearer the apparatus, an electrostatic capacity is slightly generated between the human body 20 and the sensor conductive plate 24. Furthermore, earth impedance (Ze) 22 of the capacity is mainly generated between the human body 20 and an earth 21. Generally, the earth impedance (Ze) 22 of the capacity is lower than impedance of a capacity 23 (the effect of false ground).

The non-vibrating system 2 has a ground 16 to be falsely grounded to the earth 21 through the capacitance or across commercial power supply line (AC 100 V, AC 200 V line) (not shown), the ground 16 having lower impedance comparatively to the earth impedance (Ze) 22. Thus, the human body 20 is contained in the non-oscillating system. In addition, it is said that the human body 20 has a conductive resistance of 10 or less kΩ.

Accordingly, a generation of oscillatory potential difference is caused between the human body 20 and the sensor conductive plate 24 and thereby an AC current is slightly passed through the capacity coupling 23. Actually, the sensor conductive plate 24 generates the voltage oscillation. However, considered from macro aspect of electric phenomenon, the generated voltage oscillation may be based on either of the human body 20 and the sensor conductive plate 24. Whereas, from the viewpoint of the voltage-oscillating system 1, it seems that the human body 20 generates the voltage oscillation, as being observed or measured. Thus, when the human body 20 generates equivalent voltage oscillation, the electric oscillation from the human body 20 is transmitted as an AC signal into the sensor conductive plate 24 to be imprinted on an input of the signal processing circuit 25. This means, "Ptolemaic theory" in the electric system mentioned above.

For a better understanding of the present invention, description will be made with reference to another example. If ground of a single battery is based upon a negative terminal, the single battery has a "positive power supply". If ground of the single battery is based on a positive terminal, the single battery has a "negative power supply". Therefore, the battery provides reverse operations depend on the terminals. As another example, it is well known that a current is passed in reverse in moving direction of electron. The theory is still used, because the direction of the current was detected (prior to the discovery of the movement of electron). Thus, considered from macro aspect of electric phenomenon, the voltage oscillation can be based on either the voltage-oscillating system or the non-oscillating system. Therefore, the apparatus may not be modified by use of Kirchhoff's, Fleming's laws and Maxwell's electromagnetic field equation.

The AC signal equivalently received by the sensor conductive plate 24 is processed as a signal to ground with a single end only by the signal processing circuit 25.

The signal processing may not be made by use of conventional complicated means in which a differential balance is utilized. In the apparatus of the present invention, the signal processing may be performed only by normal counter-ground amplification, band-pass, filtering, AC/DC conversion (AM detection), A/D conversion and the like.

A microcomputer for signal processing can be contained in the signal processing circuit 25.

A judgment of either no existence of the conductor to be detected, the detected conductor around the apparatus, or the detected conductor at interval of about 1 m from the apparatus is made in accordance with the received signal level of the sensor conductive plate 24. When the signal is received through the coupling capacity 23, it passes at lower level. Therefore, possible avoidance of the loss must be considered. In order to reduce noise from the outside of the apparatus, it is considered to provide a shield plate 4. However, great floating capacity occurs between the shield plate 4 and the sensor conductive plate 24. The floating capacity is sometimes, for the constructional reason, up to 500 to 1000 pF. In this embodiment, the impedance of the floating capacity is 700 Ω to 3500 Ω, relative to the signal frequency of 460 kHz. Conventionally, the avoidance of the undesirable influence described above had difficulty. The signal processing circuit 25 of the present apparatus has the input impedance at 7.5 or less Ω (detail descriptions will be made later) so that 98 or more % of the received AC signal current of the conductive plate 24 inputs into the signal processing circuit 25. Thereby, a small change in the great floating capacity due to temperatures or mechanical shocks exerts no influence upon the accurate measurement of the signals. The effects of the advantage are remarkably exhibited in the apparatus illustrated in FIG. 1.

The output of which has been processed by the signal processing circuit is transmitted to an interface 15 of the non-oscillating system 2 through the isolator 13. The isolator 13 sends electrical information of analog or digital sources. The interface 15 may be provided with an A/D converter, a microcomputer or the like.

Alternatively, the microcomputer may be disposed in both the voltage-oscillating system 1 and the non-oscillating system 2.

Following several passages describes an example of the human body 20 who is sitting on the insulating chair or who is standing on the stand, or the conductor positioned at the interval location in the air. The earth impedance (Ze) 22, off course, rises high, and the effect of the false earth falls. An actual measurement was made with the earth capacity in 10 kHz electric oscillation frequency, when the human body 20 stood on the stand at the level of 20 cm from the ground. As a result of the measurement, the earth capacity was less than 1 pF. On the other hand, with 460 kHz electric oscillation frequency, the actual measurements of the earth impedance was made. As a result of the measurements, the earth impedance (Ze) 22 was about 7 kΩ. If the earth capacity is 1 pF, the earth impedance in 460 kHz electric oscillation frequency is 350 kΩ. It is apparent that there is any cause for the effect of the false earth besides the earth capacity.

As a result of various experiments, it was found that the effect of the false earth (the suppressible effect of voltage oscillation) would be caused by a load of electromagnetic radiant impedance generated from the human body 20 as antenna.

Another example of the effect of the false earth is given. Even though the human body 20 stood on an insulating stand at the level of 1 m on the earth, no difference of the effect of the false earth was exhibited, relative to the effect described above. Furthermore, when an adult squat down or when an elementary school child in lower grade stood on the stand, the earth impedance (Ze) 22 was 15 kΩ in the actual measurement. Moreover, in either case, when the signal frequency was 200 kHz, the effect of the false ground fallen down to 1/2 to 1/2.5, (while the earth impedance (Ze) rose).

To summarize, the radiant impedance of an electromagnetic wave is, when the detected conductor has far smaller size as compared with the wavelength, generally in inverse proportion of the product of the electric oscillation frequency by the size (mainly length) of the detected conductor. It should be understood that the radiant impedance of the detected conductor with same size as the human body would have the above-described value, since the wavelength of the electromagnetic wave of 200 kHz to 500 kHz is 1.5 km to 600 m. It is noted that when the conductor with the electrically floating state and smaller size is detected, the electric oscillation with higher frequency will be needed. With the frequency, the importance of the effect of the false earth effect is remarkably demonstrated, particularly in the apparatus illustrated in FIG. 1.

For the apparatus for detecting an approaching conductor illustrated in FIG. 2, the magnitude of a detection current which was received by the sensor conductive plate through the coupling capacity 23, was also important. The identification of the detection current is within the noise level in the input circuit of the signal processing circuit 25. The magnitude of the current passing through the coupling capacity 23 is in proportion to the product of the frequency of the electric oscillation by the coupling capacity 23. In the embodiment, when the sensor conductor plate 24 of a size of 20 cm×20 cm was used at the oscillation frequency of 460 kHz, an adult at the distance of approximately 1 m could be unconditionally detected. With over 200 kHz oscillation frequency, an adult at the distance of approximately 0.5 m could be detected. In the case of an elementary school child in lower grade, The minimum of the detection distances shortened by approximately 2/3.

From these results, it is apparent that the desirable oscillation frequency will be over 200 kHz.

Figure 1:
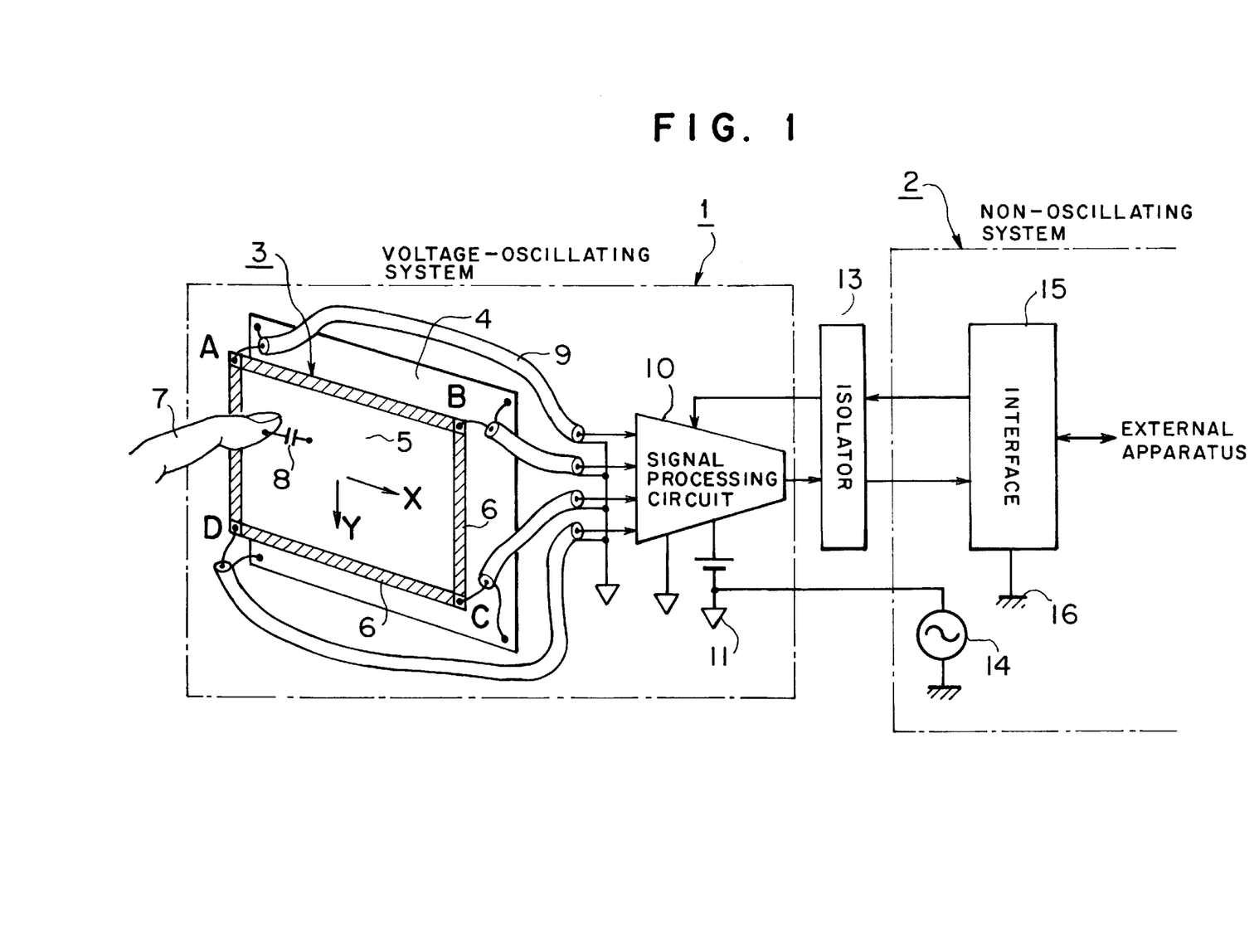
FIG. 1 is a schematic view of an apparatus for detecting a point of an approaching conductor such as a finger, using a sensor panel having a uniform resistance surface.

The following passages describe an apparatus for detecting an approach point of a conductor (or finger), using a sensor panel having a uniform face resistance, as shown in FIG. 1. In the apparatus, many parts are identical to ones of the apparatus described in FIG. 2. So, descriptions will be made mainly about only the different parts, and like parts have similar reference numbers. The apparatus illustrated in FIG. 1 detects an approach point (X, Y points) of a conductor (finger) 7 on a surface of a sensor panel 3, when the conductor approaches to the surface of a sensor panel 3.

The actual construction of the sensor panel 3 will be simply described. The sensor panel 3 has a (membrane-like) resistor 5 with an uniform distribution and two dimensions (in the any directions), which is formed on the surface of transparent glass, resin or an opaque insulating surface (not shown) by coating, vapor deposition, and other process. The resistor 5 comprises, as required, transparent materials such as an ITO (indium tin oxide) membrane, and an NESA (tin oxide), and opaque materials such as a carbon membrane. The sensor panel 3 has a stripe-like electrode 6 closely disposed in the outer periphery thereof, whose face does not have greater resistance than the resistor 5. Various shapes of the resistor 5 have been proposed. The present embodiment employs a simple straight-line shape. Drawing wires (shield electric wires 9) are connected to four corners of the stripe-like electrode 6, and connected to four low input impedance current/voltage converter circuits of an input section of a signal processing section 10. In the outer periphery thereof is closely disposed a stripe-like electrode 6 having a considerably smaller face resistance than that of the resistor 5. While various shapes of the stripe, like electrode 6 have been proposed, the present embodiment employs a simple straight-line shape. Drawing wires (shield electric wires 9) are connected to four corners of the stripe-like electrode 6, and connected to four low input impedance current/voltage converter circuits of an input section of a signal processing section 10. Note that the upper surfaces (touch surfaces of a finger) of the resistor 5 and the stripe-like electrode 6 are actually covered with an insulating sheet, a glass plate or the like, also that an operator and others are not in direct contact with the conductive portion. The shield plate 4 need not always be provided.

As shown in FIG. 1, when the fingers (conductors) 7 are approached to each other on the surface of the resistor 5, an electrostatic capacity coupling 8 is present therebetween, which is about 5 to 10 pF in the touch state depending on the thickness of an insulating layer on the surface. The voltage-oscillating system 1 is driven, for example, at 460 kHz by a oscillating voltage generator 14, similarly to the FIG. 2 embodiment. An operator (not shown) belongs to a non-oscillating system for the reasons previously mentioned, and accordingly, a oscillating current (AC signal current) flows between the finger 7 of an operator (conductor) and the resistor 5 through the coupling capacity 8. In the present embodiment, the signal current flowing through the finger 7 is approximately 20 $\mu$A rms on the maximum.

The resistor 5 has uniform resistance values distributed, and much more signal current flows into the stripe-like electrode 6 near the extreme end of the finger 7. Accordingly, it is possible to detect an approach point or position of the extreme end of the conductor (finger) 7 on the surface of the sensor panel 3 from a level of a signal current equivalently flowing into each input of the low input impedance of the signal processing section 10.

Since a portion of a current equivalently flowing into one point (imaginary center point) of the plane resistor 5 from the extreme end of the finger 7 is to be detected, this is rather closer to the technical idea of PSD (optical/charge position detection element). The main difference from PSD comprises the following three points in connection with signals to be handled. The first point is that PSD handles a DC signal while the present apparatus dynamically handles an AC signal. The second point is that the size is far larger than PSD, and particularly a floating capacity is large, and when a shield is applied, it will be sometimes 500 to 2000 pF. The third point is that a considerably larger noise (disturbance) than a signal voltage is normally present so that impossibility of detection or extreme deterioration of accuracy is liable to occur. The present apparatus sufficiently copes with these three points. A degree of the said coping is greatly affected by the performance of the input section of the signal processing circuit 10, details of which will be described later.

When the finger 7 touched the surface of the insulating layer of the sensor panel 3, the coupling capacity 8 is 5 to 10 pF, and at 10 pF, its impedance is 35 k$\Omega$ at 460 kHz. The earth impedance 22 for obtaining the false earth effect of the human body 20 is desired to be less than 30 k$\Omega$. With respect to the S/N ratio of the detection signal, in the case of the sensor panel 3 corresponding to the A4 Format, the S/N ratio need be 65 dB or more as it turns out for obtaining the position resolution of 0.2 mm. As a receive signal current from the finger 7 for obtaining the S/N ratio, at least 5 $\mu$Arms was necessary, in the case of the present embodiment, depending on the processing means at the signal processing circuit 10. The oscillation frequency is preferably 200 kHz or more for obtaining the unconditional false earth effect and for securing the signal current passing through the coupling capacity 8.

The distortion of a detection position will be described hereinafter. In the present embodiment, the stripe-like electrode 6 is in the form of a simple straight line. It has been heretofore known that in this construction, the larger the ratio between the face resistance value of the resistor 5 and the face resistance value of the stripe-like electrode 6, the smaller the curvedness of the position detection. In has been also proposed that the curvedness is also improved by thinking out a pattern of a peripheral electrode. In the present embodiment, a parameter was employed so as to decrease the curvedness as less as possible in a simple peripheral electrode pattern. The face resistance value of the resistor 5 is 1 k$\Omega$, and the resistance value between both ends of each side of the stripe-like electrode 6 is 350 $\Omega$. The X-direction detection position line according to the actual measurement at that time is shown in FIG. 5, and that of Y-direction is shown in FIG. 6.

Figure 5:
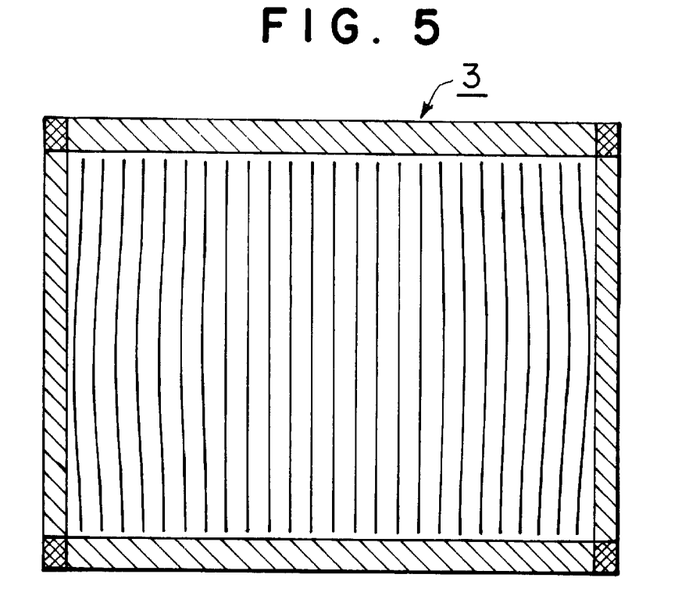
FIG. 5 shows position-detecting lines in the direction of X.
Figure 6:
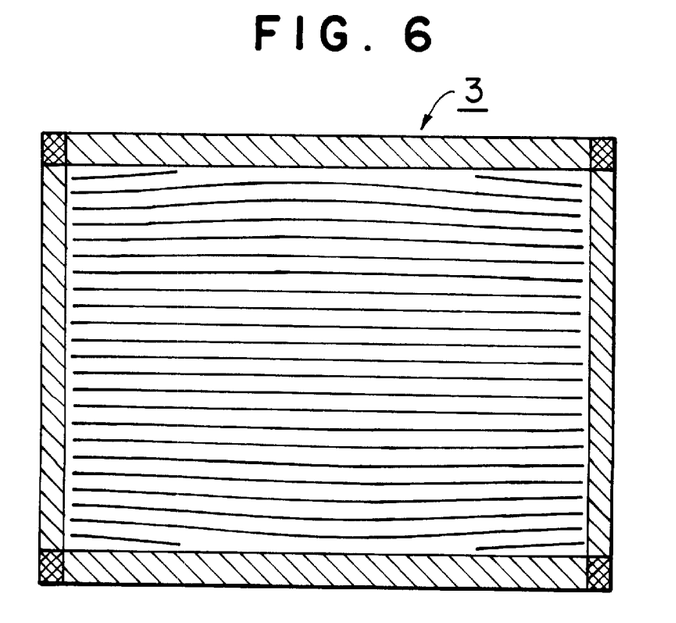
FIG. 6 shows position-detecting lines in the direction of Y.
Figure 7:
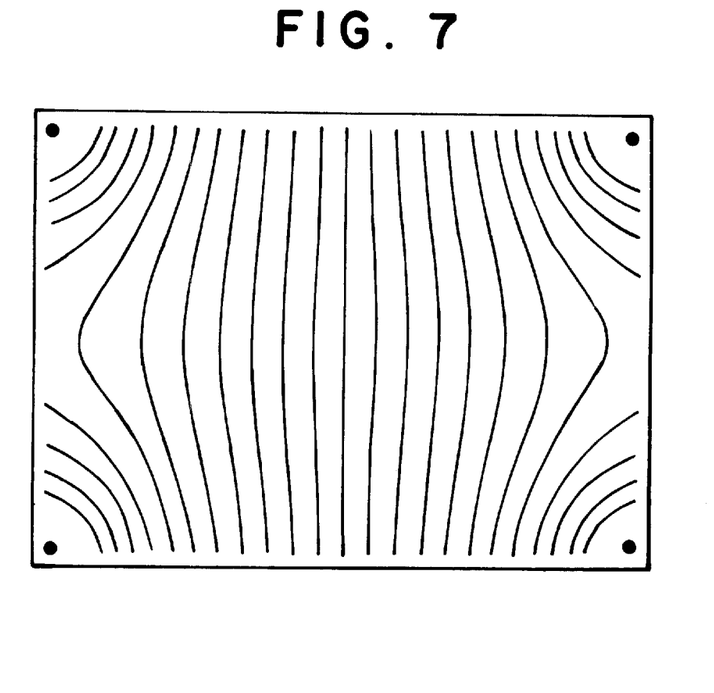
FIG. 7 shows position-detecting lines in the direction of X, when stripe-like electrodes 6 with low resistance are provided on a panel.
Figure 8:
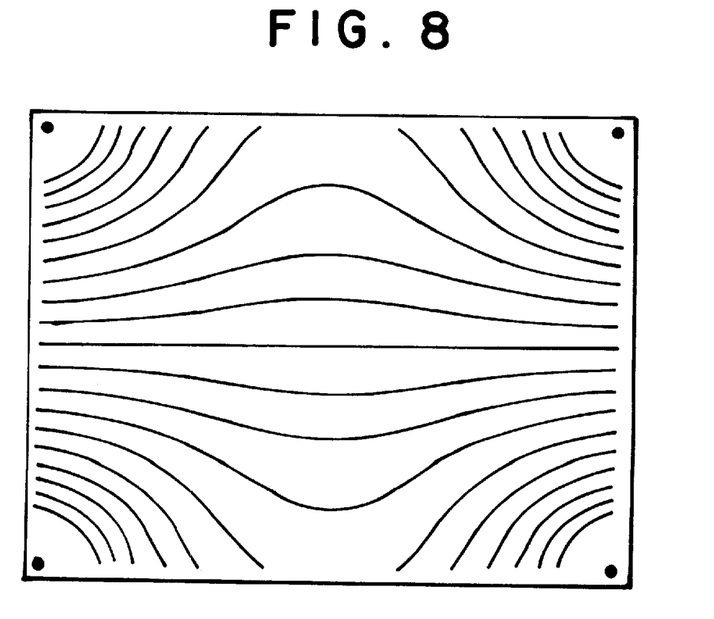
FIG. 8 shows position-detecting lines in the direction of Y, when stripe-like electrodes 6 with low resistance are provided on a panel.

If the input impedance of the signal processing section 10 is lowered to about 1 $\Omega$ while securing the circuit stability, it is possible to make the detection position lines (detection position distortion) shown in FIGS. 5 and 6 further straight-line with the resistance value of the stripe-like electrode set to about ⅕ in the present embodiment. A microcomputer (not shown) within the present apparatus corrects the curvedness. For reference, the X-direction detection position line in the case where the stripe-like electrode 6 is not present is shown in FIG. 7, and that of the Y-direction is shown in FIG. 8. FIGS. 5 to 8 show loci when a conductor corresponding to a finger is moved so that the following computation results are equal. The position computation formulae are as follows:

Formalized X=$(iB+iC-iA-iD)/(iA+iB-iC-iD)$

Formalized Y=$(iC+iD-iA-iB)/(iA+iB-iC-iD)$

The X and Y directions shown in FIG. 1 were made positive directions with a central portion of the sensor panel 3 being an original point. The iA+iB−iC−iD indicates AC signal current values which flow from points A, B, C and D, respectively.

It is understood from FIGS. 7 and 8 that when both the drawings are superposed, an area where the detection position lines are nearly parallel merely comprises a substantially one dimensional information, which is a place being impossible to decide an accurate two-dimensional position or a place where accuracy is extremely bad, and those except the central portion are areas that cannot be used in practice. It is also understood from the above that the stripe-like electrode 6 has the effect to distribute the detection current to the points A, B, C and D in the directions of X and Y.

Figure 3:
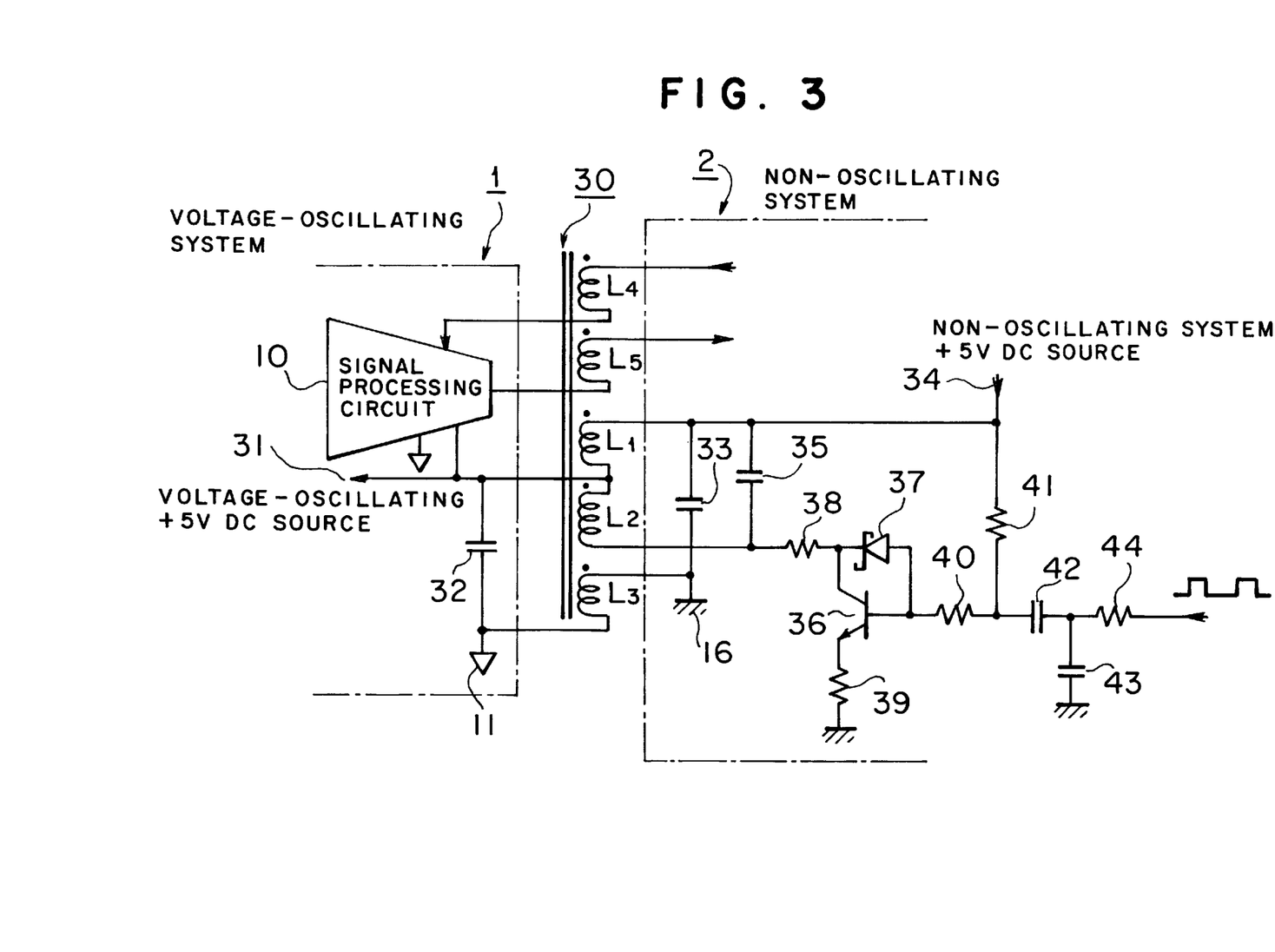
FIG. 3 shows an example of an operation and a power supply of a voltage oscillating system, and an isolator circuit.

Next, out of the detailed circuits, main parts supporting the present invention will be explained. FIG. 3 shows an example of a circuit for driving the voltage-oscillating system 1 at 460 kHz and supplying a power and a circuit corresponding to the isolator 13. Main part comprises a multiwire common mode resonant transformer 30, which is a group of coils wound around the same closed magnetic path magnetic core in the form of a donut, EI or the like. In the figure, coils shown by L1, L3, L4, and L5 are the same winding number, which AC vibrate in the same voltage and same phase. Reference numerals 32 and 33 designate decoupling capacitors having a large capacity, and the coils indicated by L1 and L3 of the multiwire common mode resonant transformer 30 are connected in parallel in an AC manner. The grounds of the voltage-oscillating system 1 and the non-oscillating system 2, and the +5 V power supply are connected through the coils L3 and L4, respectively. The coil L1 is an inductance combined with the coil L2 to constitute a parallel resonant circuit together with a capacitor 35. The resonant circuit (L1, L2, L3) is driven by a transistor 36.

When a drive pulse is applied through a resistor 44, a simple low pass filter constituted together with a capacitor 43 provides a smooth waveform, and a base of the transistor 36 is AC driven at approximately 4 Vpp through an AC coupling capacitor 42. The base of the transistor 36 is forward biased merely for the time of 10 to 15%, and other time is reverse bias. A collector and an emitter of the transformer 36 are intermittently energized to drive the resonant circuit (L1, L2, 35) through a resistor 38. That is, the transistor 36 provides the C-class operation, which has high efficiency. The lower end (hot end) of the coil L2 is subjected to sine wave oscillation at approximately 10 Vpp, and AC voltage divided by the coils L2 and L1 causes the oscillating system 1 to vibrate with sine wave. A consumption current of the +5 V power supply of the non-oscillating system 2 for driving the voltage oscillating system 1 is approximately 2 mA. A shot key barrier diode 37 is provided for normal non-saturation of the transformer and also has a function to vibrate the resonant circuit (L1, L2, 35) at fixed voltage. For objects and values of resistors and capacitors, refer to the column of description of reference numerals.

The coils L4 and L5 correspond to the isolator 13 in FIG. 1, which transfers an analog or digital electric information between the voltage-oscillating system 1 and the non-oscillating system 2. In the case where further electric information wires are necessary, a coil added in the same winding number as the coil L1 or the like may be provided for that purpose. In the case where the oscillating voltage of the voltage-oscillating system 1 is less than 2 Vpp, and only the digital electric information by way of CMOS logic will suffice to be transmitted, it is also possible to transfer the electric information through only the resistor in place of the coils L4, L5 of the like as the isolator 13.

A power current flowing through the coils L1 and L3 and a return ground current thereof are the same in magnitude and reversed in direction, and therefore, negate the magnetic line of force each other. Further the current flowing through the coils L4, L5 or the like is less to an ignorable extent. Accordingly, a resonant current flowing through the coil L2 comprises a main source for the magnetic line of force. A magnetic core of the multiwire common mode resonant transformer 30 is hard for magnetic saturation, and the multiwire common mode resonant transistor 30 can be considerably miniaturized.

Figure 4:
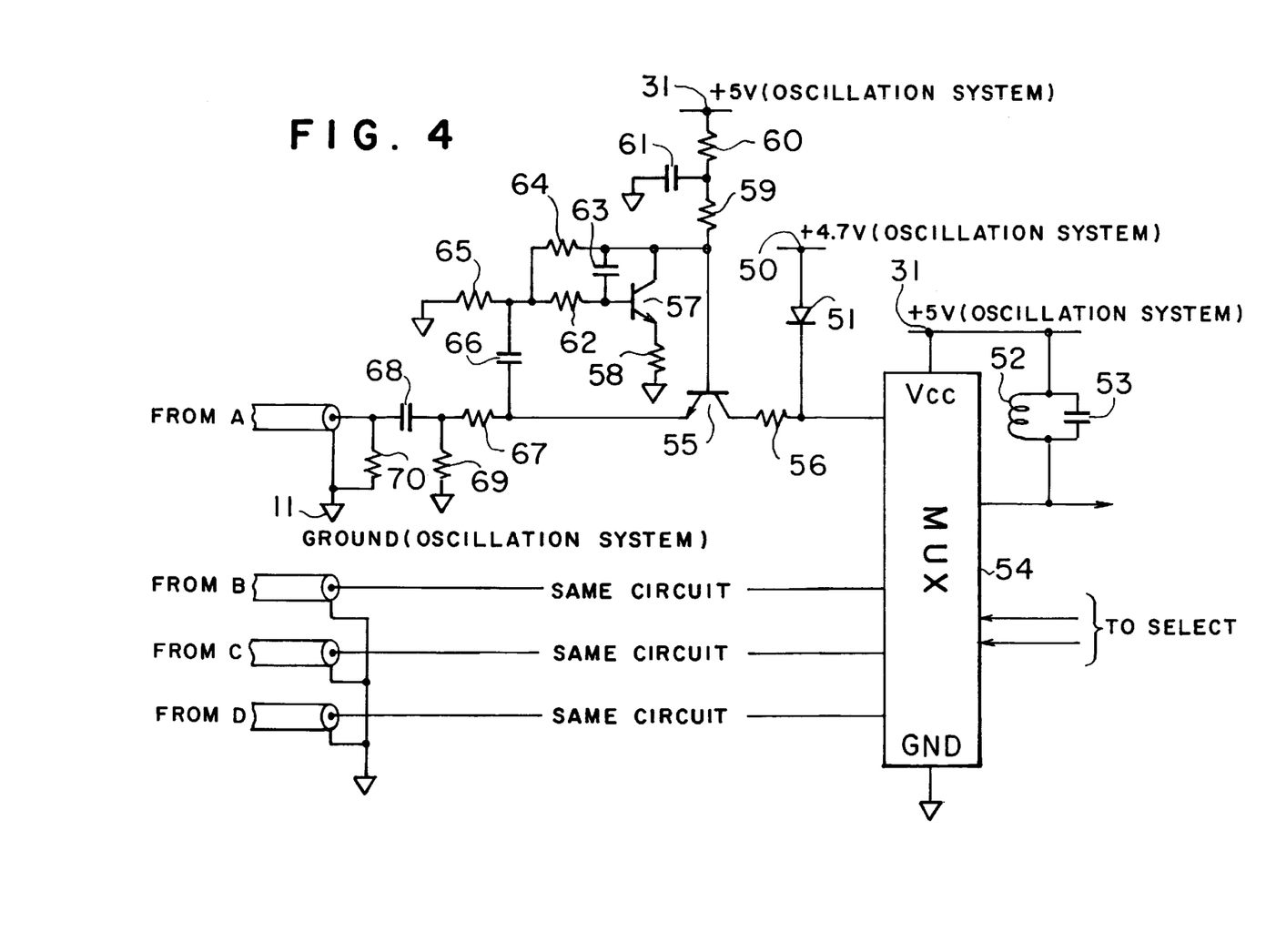
FIG. 4 shows an example of a conversion of a detected current/voltage, and a time-shared control circuit.

The circuit shown in FIG. 4 is an example of the input circuit of the signal processing section 10 shown in FIG. 1. This is a fundamentally an AC current/AC voltage converter circuit, and main parts comprise a transistor 55 and LC parallel resonant circuits 52 and 53. The transistor 55 is base-grounded through a resistor 59 to transmit about 99.5% of an AC signal current input into an emitter to a collector. The collector circuit of the transistor 55 assumes a high impedance in a signal frequency when being selected by an analog multiplexer 54, and the transformer impedance value is large, and accordingly, the current/voltage conversion efficiency is high. The current/voltage conversion efficiency is high, but other features are that a dynamic range is extremely large and that the noise bearing amount is drastically strengthened, details of which will be described later. An output impedance of a collector itself of the transistor 55 is large, and the Q values of the parallel resonant circuits 52 and 53 are not lowered much. Therefore, only the component of necessary frequency (oscillation frequency of voltage-oscillating system 1) is converted into a voltage.

In the analog multiplexer 54, one circuit out of four input circuits is connected to the parallel resonant circuits 52 and 53 so that detection currents from the points A, B, C and D can be measured by time division. The diode 51 is a substitute load having a clamping function in which also when not selected by the analog multiplexer 54, the input circuit is operated so that the input impedance of the instant circuit is always held at a fixed value. The multiplexer 54 has a floating capacity therein, but it comprises no factor of a signal loss because seeing it as a part of the resonant capacitor 53. Further, the present apparatus provides the counter-ground signal processing, and therefore, there is no harmful spurious component applied to the signal component from all the floating capacities of the instant circuit. This is also one of features of the present apparatus.

The emitter input impedance of the transistor 55 is about 20 $\Omega$ in case of the present embodiment, and only this is not sufficiently low input impedance. Therefore, an inverted amplification circuit by way of a transistor 57 is added. When an emitter voltage of a current/voltage conversion transistor 55 is varied, it is applied, as a voltage varied component, to a base of a transistor 57 through an AC coupling capacitor 66. The said voltage varied component is inverted in phase by an emitter earth transistor 57 and applied to a base of the transistor 55 to modulate the base DC voltage. This modulation works in the direction of lessening the emitter voltage variation of the transistor 55. That is, the emitter input impedance of the transistor 56 lowers. In the present embodiment, 6.5 $\Omega \pm 1$ $\Omega$ was obtained at 460 kHz. For the circuit constant, refer to the column of description of reference numerals.

Attention is invited to the fact that the floating capacity connected to the emitter of the transistor 55 is large, 50 to 2000 pF. Accordingly, the phase compensation by way of a resistor 62 and a capacitor 63 is necessary for the stable operation of the circuit. Even so, the open loop gain rarely lowers at 460 kHz in the present embodiment. This circuit is quite stable even the input floating capacity of 2000 pF. When an operational amplifier is used in place of the present circuit, a floating capacity enters a summing point, and therefore the stable operation is hard to attain. If the floating capacity is far less than 2000 pF, it is easy to lower the input impedance to about 1 $\Omega$ merely by slightly changing the constant in the FIG. 4 circuit.

When the input impedance of the circuit shown in FIG. 4 is not sufficiently small as compared with the resistance value between opposite ends of each side of the stripe-like electrode 6 of the sensor panel 3, the current distribution ratio to the points A, B, C and D becomes small, thus resulting in a factor of error in detection position. Further, to make the input impedance value small is to prevent the signal loss caused by the high floating capacity, as mentioned previously. In the present apparatus using one layer of plane resistor as a sensor panel, the position is detected from a current ratio detected from four corners, and the signal loss is preferably as less as possible. It has been assured that 6.5 $\Omega \pm 1$ $\Omega$ in the present embodiment is a sufficiently low value in practical use.

In the conventional apparatus for absorbing a signal in a finger, AC signal flow out into the floating capacities of the shield plate, the shield wire, the apparatus casing and the like, and the essential full amount caused by absorption of AC signal in a finger is less than 5%, thus making it very difficult to secure the detection position accuracy. In the present embodiment, the in-flow AC signal from the floating capacities of the shield plate 4 and the shield wire 9 is not present but flows in a small amount from the apparatus casing. However, since the full AC signal current portion from the finger 7 is approximately 80%, reliability of signal extremely increases as compared with prior art to enable the approach position detection more stable and more accurately. This is also a great feature of the present apparatus for handling a counter-ground signal.

The noise bearing amount of the circuit shown in FIG. 4 will be described. In the transistor 55, about 99.5% (substantially fixed value) of an emitter instantaneous current is transmitted to its collector, almost irrespective of its current value, till the emitter instantaneous current is close to zero, whereby the linearity is sufficiently good, and the linearity of the circuit is maintained. That is, the AC signal current is about 20 μArms at the most, and no distortion occurs in a signal frequency component with respect to the entry of noise by which about 1.3 mA of DC bias current is close to zero. Even if the noise of frequency component different in +32 dB of a signal level enters, the detection position is not deviated. That is, even if the current/voltage conversion efficiency is high, and the noise in a frequency band different from a signal frequency should enter at a level of +32 dB, the present circuit is not saturated and the dynamic range is extremely large. Further, since the input section is an AC coupling, the noise bearing amount of +109 dB is present with respect to the power induction noise component of 50 to 60 Hz of the commercial power supply.

The bearing noise performance (noise margin degree) is realized by the possibility of the counter-ground signal processing in the voltage-oscillating system to provide a stable operation under the environment used along with a television, a personal computer, a CRT monitor, a liquid crystal display and the like. Incidentally, the noise margin degree of the conventional electrostatic capacity coupling type finger touch position detection apparatus is about 0 dB at the most of all frequencies except the signal frequency.

Needless to say, one circuit out of four input circuits shown in FIG. 4 can be also used for the approach detection apparatus shown in FIG. 2 except the analog multiplexer 54 and the clamp diode 51. Further, the circuit shown in FIG. 4 can be applied to the apparatus of the type in which an AC signal is transmitted from a pen-shaped active position indicator to a sensor panel (not a voltage-oscillating system) through a coupling capacity, in which case, also, there is a margin degree of +32 dB with respect to the frequency component different from the AC signal frequency, similarly to the former. In this case, also, there is a noise margin degree of +109 dB with respect to 60 Hz. In the constitution using an operational amplifier, saturation tends to occur, failing to obtain the aforementioned bearing noise performance.

Figure 9:
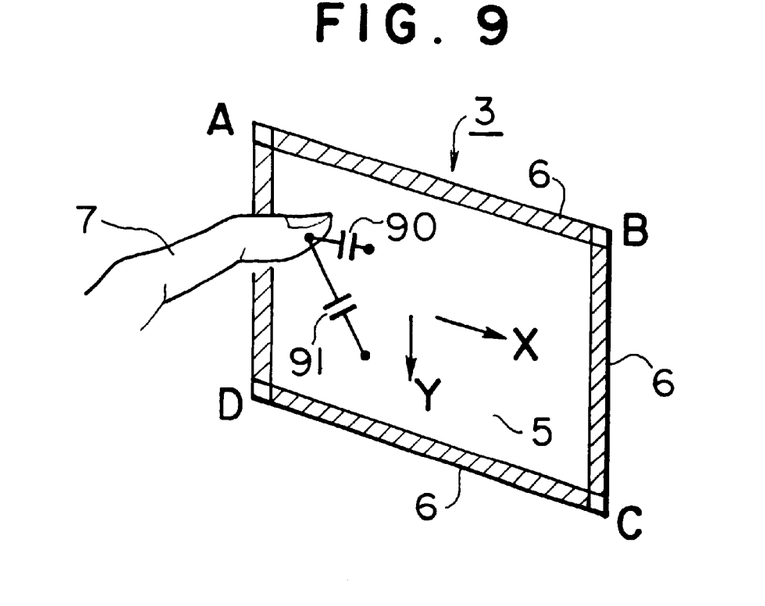
FIG. 9 is a view of assistance in explaining the coupling capacity ratio when a finger approaches to the surface of a sensor panel.
Figure 10:
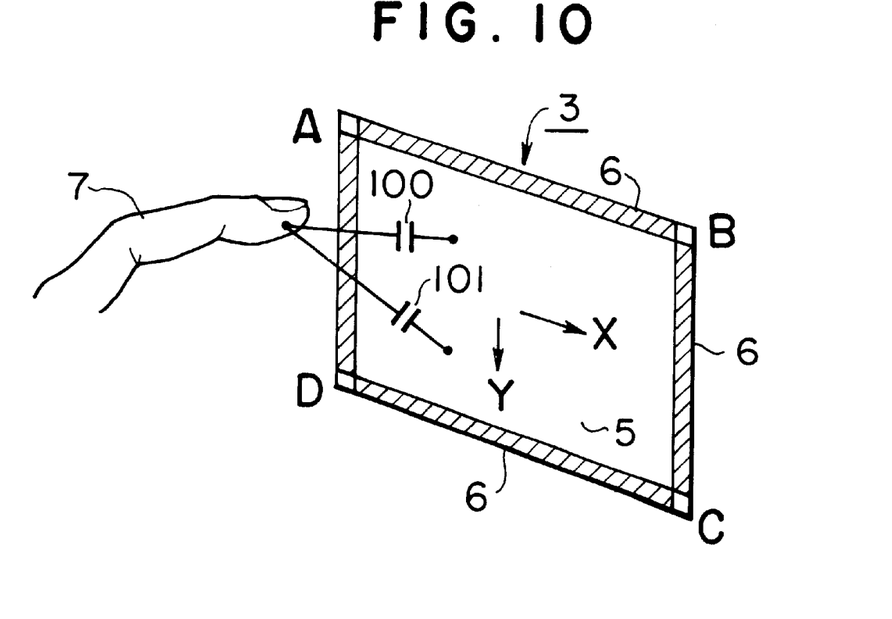
FIG. 10 is a view depicting the coupling capacity ratio at a time when a finger is at a slightly distant point from the surface of a sensor panel.

The deviation of position detection in the case where a conductor such as finger 7 floats from a sensor panel 3 will be described hereinafter. FIG. 9 shows coupling capacities 90 and 91 with respect to two points of the sensor panel 3, in the case where the finger 7 is near the surface of the sensor panel 3. FIG. 10 shows coupling capacities 100 and 101 with respect to two points of the sensor panel 3, in the case where the finger 7 is slightly away from the surface of the sensor panel 3. In FIGS. 9 and 10, X and Y positions of the senor plate 30 of the finger 7 are the same. The coupling capacities 90 and 91 are large in capacity ratio, and the coupling capacities 100 and 101 are small in capacity ratio.

Actually, the coupling capacity is distributed over the entire surface of the senor panel 3, and in the case where the finger is slightly away from the surface of the sensor panel 3, the current distribution ratio to the points A, B, C and D is somewhat small, and accordingly, the detected position is calculated toward the center of the sensor panel 3. In the present apparatus, a microcomputer (not shown) housed therein corrects the deviation in detection position. Whether the finger 7 is near or away is judged from the add value of Ac signal current values detected from the points A, B, C, and D. The correction amount depends on the size of the sensor panel 3.

Figure 11:
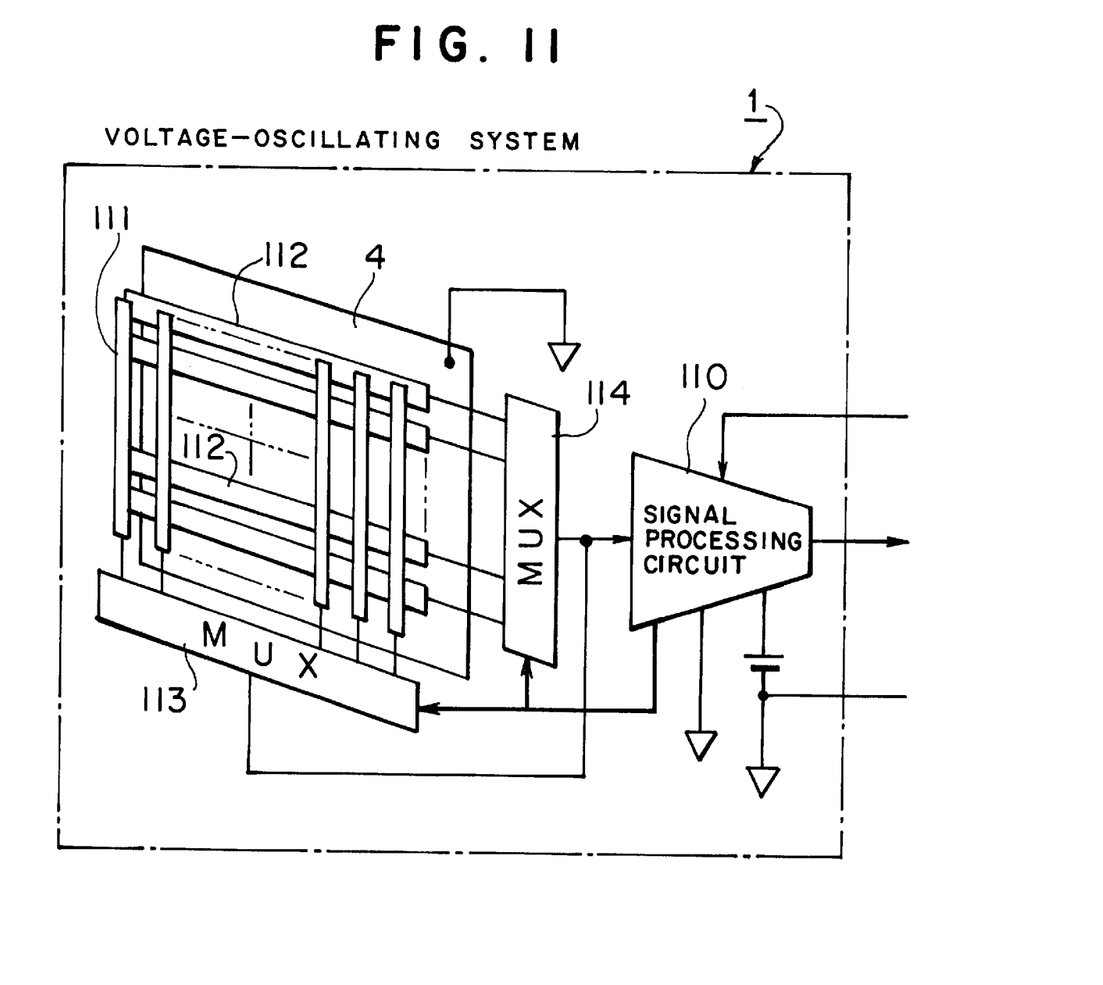
FIG. 11 is a schematic view showing the constitution of a voltage oscillating-system of an apparatus for detecting an approach point of a conductor such as a finger by use of a latticed sensor conductor array.

FIG. 11 shows the constitution of a voltage-oscillating system for an apparatus for detecting an approach position of a conductor such as a finger, using lattice-like sensor conductor arrays 111 and 112. X and Y direction analog multiplexers 113 and 114 sequentially switch the sensor conductor arrays 111 and 112 for detecting X and Y directions to apply them into an input of a signal processing section 110. The touch position of a conductor such as a finger is calculated from an AC signal level (current or voltage) detected (received) by the sensor conductors 111 and 112. The construction of the sensor section is accomplished as compared with one shown in FIG. 1. However, since only the portion between the sensor conductors 111 and 112 may be interpolated in position analogwise, the detection position accuracy is better than that shown in FIG. 1. This apparatus is also possible to carry out the counter-ground signal processing, and has the above-mentioned merits.

There was obtained an apparatus for detecting access and approach positions of a conductor, which is simple and excellent in bearing noise property, by the counter-ground signal processing, without performing complicated signal processing such as a differential balance or the like. Further, the bad influence of the floating capacity such as the shield was nearly removed. Further, by making the factor of the false earth effect clear, the stable detection of access and approach positions of a conductor was enabled unconditionally including the human body electrically floating in the air.

Figure 12:
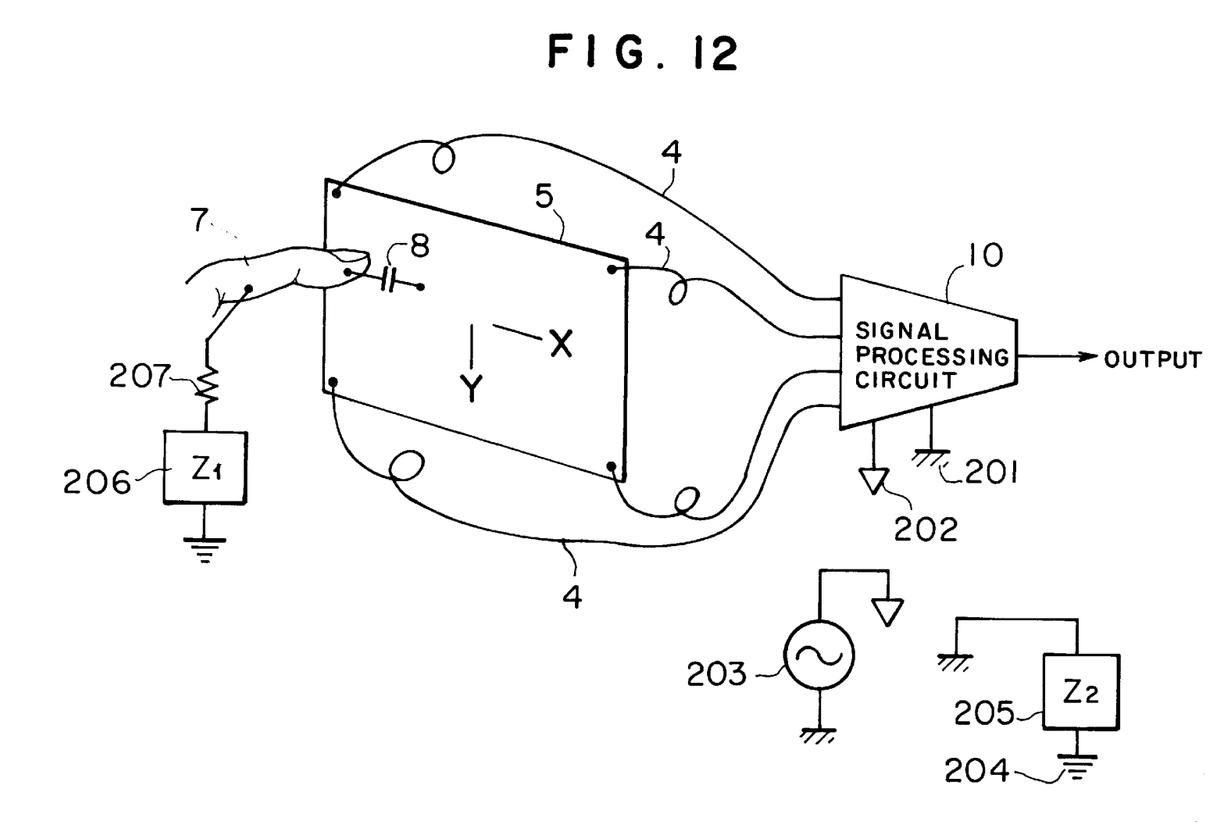
FIG. 12 is a schematic view showing one example of an electrostatic capacity type touch panel apparatus in which a point of a finger is detected on (coordinates on a panel) and a uniform resistive membrane is used so that an AC signal is applied into the finger.

Another embodiment will be described with reference to FIG. 12. FIG. 12 is a schematic view showing one example of an electrostatic capacity type touch panel apparatus, in which an AC signal is absorbed into a finger, the apparatus using a panel in the form of a uniform resistive membrane for detecting a position (coordinate of a panel) of a finger. A resistive membrane 3 is a face resistance uniformly formed by coating, vapor deposition or the like on one surface of transparent glass, resin, or an opaque insulating substrate. A finger 1 normally touches the surface of an insulating substrate, but does not directly touch the resistive membrane 3.

Four corners of the resistive membrane 3 are connected to four panel terminals of a signal processing circuit 5. A signal generator 8 generates an electric signal (AC signal) used by the present apparatus to detect a position of a finger 1 to voltage-drive a dynamic reference potential 7. Four panel terminals of the signal processing section 5 has a function to dynamically follow in potential with respect to the dynamic reference potential 7 and at the same time, capable of measuring each AC current for driving connection wires 4, . . . , 4, detailed description of which is omitted. Accordingly, the whole surface of the resistive membrane 3 follows in potential in AC component with respect to the output of the signal generator 8.

The finger 1 is grounded through an earth impedance 11 (Z1) of the human body caused by an equivalent resistor 12 of the human body, an earth capacity and others. When the finger is approached to the resistive membrane 3, an electrostatic capacity (capacity coupling) 2 is present, though small, therebetween as shown in FIG. 1. Accordingly, a small amount of AC current caused by the signal generator 8 flows between the finger 1 and the resistive membrane 3. The resistive membrane 3 has uniform resistance values distributed as mentioned above, and much current absorbed in the finger 1 as viewed from the present apparatus flows into the connection wire 4 closer to the extreme end of the finger 1. Accordingly, the position (coordinate) of the finger 1 on the resistive membrane (panel) 3 is detected from drive AC current measured values of four panel terminals of the signal processing section 5.

By making the circumference of the resistive membrane 3 an electrode of low resistance, or by mounting connection wires to not only four corners of the resistive membrane but also much more peripheral points, the calculation accuracy of the detection coordinate can be also enhanced. Further, the shield plate and the shield membrane are provided on the back of the resistive membrane 3 in parallel with the resistive membrane 3 to enable enhancement of the S/N ratio of the detection signal, but these various effects depart from the subject matter of the present application, details of which are omitted.

An earth impedance 10 (Z2) of the circuit is an impedance grounded through a capacity or a commercial power supply line (AC 100 V, and AC 200 V lines), and is normally a lower impedance than the earth impedance 11 (Z1) of the human body.

A loop of AC signal current comprises a circuit ground 6, a signal processing circuit 5, connection wires 4, . . . 4, a resistive membrane 3, an electrostatic capacity 2, a finger 1, an equivalent resistor 12 of the human body, an earth impedance 11 (Z1) of the human body, an earth 9, and an earth impedance 10 (Z2) of the circuit. Among these, in the past, the factor of the earth impedance 11 (Z1) of the human body has been unclear. For explanation therefor, actual numerical values are shown.

Those having a relatively high impedance within the said signal loop are the resistive membrane 3 [about 1 k$\Omega$/$\square$], electrostatic capacity 2 (capacity coupling) [about 10 pF], equivalent resistor 12 of the human body [about a few k$\Omega$ to 10 k$\Omega$], and an earth impedance 11 (Z1) of the human body [varied drastically according to the conditions]. The resistive membrane 3 is a face resistor, which is about 400 $\Omega$ at the most as viewed from the approach point of the finger 1, and is a low resistance value as compared with the equivalent resistor 12 of the human body. Further, the impedance of the electrostatic capacity 2 changes with the frequency of AC signal, for example, about 35 k$\Omega$ even at the tie of 460 kHz, which is a relatively high impedance as compared with the equivalent resistor 12 of the human body. Accordingly, the impedance of the electrostatic capacity 2 and the earth impedance 11 (Z1) of the human body mainly limit a loop current of AC signal.

When the human body ordinarily stands up on the ground with a pair of shoes, or when the human body is present directly before the conductive desk grounded in capacity, the earth capacity is more than 10 pF in actual measurement (using 10 kHz), in which case only the electrostatic capacity 2 (capacity coupling) limits a loop current of AC signal, so that a loop current of AC signals according to the distance between the finger 7 of the human body and the resistive membrane 5 (panel) flows.

Here, the case will be monitored wherein the human body is present near the insulating desk and on the insulating chair or stand. Naturally, the earth impedance 11 (Z1) of the human body increases and the earth effect of the human body decreases, and when a loop current of AC signal reduces and frequency of the signal generator 8 is 10 kHz, it has been very difficult to stable detect a touch position of the finger 7 to the resistive membrane 5 (panel).

The earth effect is caused by the radiant impedance of the human body who serves the function of an antenna, as mentioned in the descriptions of the apparatus illustrated in FIG. 1 and FIG. 2. The frequency of AC signal (frequency of the signal generator 8) is preferably, 200 kHz or more from the above-mentioned example in order to effectively utilize the earth effect of the human body caused by the radiant impedance to positively detect, even in the case of a child, its finger 1 unconditionally (in order to secure a loop current of AC signal). As described above, since the electrostatic capacity type touch panel apparatus of the type in which an AC signal is absorbed in the human body as viewed from the apparatus depends on the fact that the earth effect of the human body is effective, the above-mentioned effects act upon not only the apparatus for a coordinate input in which one point on the panel is pointed by a finger, but also the apparatus in which one section on the panel such as a touch board is pointed by a finger, or the touch panel apparatus having a switch function for detecting only the approach of a finger. Further, even the electrostatic capacity type touch panel apparatus using a pulse signal has the above-mentioned merits if a frequency component in excess of 200 kHz is included measurably in the said signal. Further, it has been assured also that even the electrostatic capacity type touch panel apparatus used for portable machineries using a battery as a power supply, the earth effect of the circuit ground is enhanced at a signal frequency in excess of 200 kHz.

By clarifying the factor of the earth effect, even the human body who floats in the air detects a touch state of a finger to the panel unconditionally and stable, thus improving the reliability of the apparatus.

NUMERICAL DESCRIPTION

1 Voltage oscillating system
2 Non-oscillating system
3 Sensor panel
4 Shield plate
5 Two-dimensionally uniform resistor
6 Stripe-like electrode with low resistance
7 Finger (conductor)
8 Electrostatic capacity coupling
9 Shield electric wire
10 Signal processing circuit
11 Voltage-oscillating system
12 Power source for voltage-oscillating system
13 Isolator
14 Oscillatory voltage generator
15 Interface
16 Non-oscillating ground
20 Human body (conductor)
21 Ground (earth)
22 Earth impedance of a Human body
23 Electrostatic capacity coupling between a human body 20 and a sensor conductive plate 24
24 Sensor conductive plate (also a resistant membrane)
25 Signal processing circuit
30 Multiwire common mode resonant transformer
31 Voltage-oscillating system+5 V power
32 Decoupling capacitor (22 $\mu$F, for example)
33 Decoupling capacitor (4.7 $\mu$F, for example)
34 Non-oscillating system+5 V power
35 Resonant capacitor (680 pF, for example)

36 C-class operation transistor (2SC4116Y, for example)
37 Shot key barrier diode
38 Compliance resistance (47 Ω (ohms), for example)
39 Resistor (4.7 Ω (ohms), for example)
40 Resistor (47047 Ω (ohms), for example)
41 DC bias current applying resistor (150 kΩ (ohms), for example)
42 AC coupling capacitor (470 pF, for example)
43 Low pass filter capacitor (100 pF, for example)
44 Low pass filter resistor (1.5 kΩ (ohms))
50 +4.7 V (Oscillating system)
51 Clamping diode (Substituted load)
52 Band pass coil
53 Band pass capacitor
54 Analog multiplexer
55 Current/voltage conversion transistor (2SC4116Y, for example)
56 Resistor (47 Ω (ohms), for example)
57 Voltage variation detecting transistor (2SC4116Y, for example),
58 Resistor (10 Ω (ohms), for example)
59 AC and DC load resistors for a transistor 57 and a base ground resistor for a transistor 55 (1 kΩ (ohms), for example)
60 DC load resistor for a transistor 57 (4.7 kΩ (ohms))
61 Decoupling capacitor (1 μF)
62 Phase compensating resistor (1 kΩ (ohms), for example)
63 Phase compensating capacitor (7 pF, for example)
64 DC divisional voltage resistor (68 kΩ (ohms), for example)
65 DC divisional voltage resistor (22 kΩ (ohms), for example)
66 Coupling capacitor for transferring a voltage variation (1000 pF)
67 Resistor (4.7 Ω (ohms), for example)
68 AC coupling capacitor (0.22 μF, for example)
69 DC current sinking resistor (1.5 kΩ (ohms), for example)
70 DC zero bias applying resistor (22 kΩ (ohms), for example) 90 Coupling capacity of an immediate approach point between a finger 7 and a sensor panel
91 Coupling capacity of an approach point between a finger 7 and a sensor panel
100 Coupling capacity of an immediate approach point between finger 7 and a sensor
101 Coupling capacity of an approach point between a finger 7 and a sensor panel
110 Signal processing circuit
111 Sensor conductive array for detection in a X direction
112 Sensor conductive array for detection in a Y direction
113 Analog multiplexer in a X direction
114 Analog multiplexer in a Y direction

What is claimed is:

1. An apparatus for detecting a approach point or position of a conductor on a sensor panel, including a voltage-oscillating system and a non-oscillating system; said voltage-oscillating system having the sensor panel which is operated by over 200 kHz frequency oscillatory voltage generator so that a AC current flowing through an electrostatic coupling between said sensor panel and said conductor is equivalently received, the sensor panel having a resistor with uniform face resistance in the two-dimensional directions and electrodes closely disposed in the periphery of said resistor, signal processing means on which AC currents from four corners of the sensor panel are impressed, a voltage oscillating system ground circuit to be also connected with the signal processing means, and a power circuit which voltage oscillates in same amplitude and same phase with respect to the voltage oscillating system ground circuit, the power circuit being connected with the signal processing means; said non-oscillating system having an interface with said voltage oscillating system and at least one or more external apparatus; and further including an isolator thorough which a digital or an analog electric information is transferred between said signal processing means and said interface.

2. The apparatus for detecting an approach point or position of a conductor defined in claim 1, wherein the ground circuit, the power supply circuit, and a digital or analog electric information wire between said voltage-oscillating system and said non-oscillating system are connected through a multiwire common mode resonant transformer wound around the same closed magnetic path magnetic core.

3. The apparatus for detecting an approach point or position of a conductor defined in claim 2, wherein said multiwire common mode resonant transformer is driven by a C-class operation transistor.

4. The apparatus for detecting an approach point or position of a conductor defined in claim 1, the apparatus further including means for providing a compensation to cause said approach point or position to be deviated from a center position in a peripheral direction, when an AC current having a value smaller than a reference current value is measured, the reference current value being a total value of AC currents flowing from four corners of said sensor panel, when said conductor touches on the sensor panel.

5. An apparatus for detecting an approach position on a position indication means on the surface of a sensor panel including: at least the sensor panel for receiving AC signal which is actively or equivalently transmitted from said position through an electrostatic coupling, the sensor panel having a resistor with an uniform resistant face in the two-dimensional directions; and a current/voltage conversion circuit on which AC currents from four corners of the sensor panel are impressed; the current/voltage conversion circuit including an emitter input transistor to be base-grounded through a resistance, parallel resonant circuit connected to a collector of said transistor LC, and an inverted amplifier for inverting and amplifying a voltage variation of said emitter input to be applied to a base of said transistor.

* * * * *